United States Patent
Dong et al.

(10) Patent No.: US 12,336,001 B2
(45) Date of Patent: Jun. 17, 2025

(54) METHOD OF DATA TRANSMISSION IN UNLICENSED BAND

(71) Applicant: ZTE CORPORATION, Guangdong (CN)

(72) Inventors: Fei Dong, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 381 days.

(21) Appl. No.: 17/844,411

(22) Filed: Jun. 20, 2022

(65) Prior Publication Data

US 2022/0386369 A1    Dec. 1, 2022

Related U.S. Application Data

(63) Continuation of application No. PCT/CN2020/076161, filed on Feb. 21, 2020.

(51) Int. Cl.
*H04W 74/0808* (2024.01)
*H04W 72/23* (2023.01)

(52) U.S. Cl.
CPC ....... *H04W 74/0808* (2013.01); *H04W 72/23* (2023.01)

(58) Field of Classification Search
CPC ......... H04W 74/0808; H04W 74/0875; H04W 72/23
See application file for complete search history.

(56) References Cited

U.S. PATENT DOCUMENTS

| | | | | |
|---|---|---|---|---|
| 2017/0318595 A1* | 11/2017 | Dinan | ................ | H04L 5/0053 |
| 2018/0352573 A1* | 12/2018 | Yang | ................ | H04W 16/14 |
| 2019/0014596 A1* | 1/2019 | Yang | ................ | H04W 72/21 |
| 2019/0053273 A1 | 2/2019 | Kim et al. | | |
| 2019/0150217 A1* | 5/2019 | Kim | ................ | H04L 1/1809 370/329 |
| 2020/0275474 A1* | 8/2020 | Chen | ................ | H04L 1/1896 |
| 2020/0337083 A1* | 10/2020 | Loehr | ................ | H04W 72/1263 |
| 2021/0007146 A1* | 1/2021 | Agiwal | ................ | H04W 74/0833 |
| 2021/0007149 A1* | 1/2021 | Li | ................ | H04W 74/0833 |

(Continued)

FOREIGN PATENT DOCUMENTS

| | | | | |
|---|---|---|---|---|
| BR | 112017007838 B1 * | 7/2024 | ........... | H04L 5/0044 |
| CN | 108476525 A | 8/2018 | | |

(Continued)

OTHER PUBLICATIONS

Extended European Search Report for EP Appl. No. 20890369.0 dated Mar. 27, 2023 (10 pages).

(Continued)

*Primary Examiner* — Chi H Pham
*Assistant Examiner* — Vladislav Y Agureyev
(74) *Attorney, Agent, or Firm* — Foley & Lardner LLP

(57) ABSTRACT

A system and method for meeting the delay and reliability requirements for signal transmission using URLLC in the unlicensed band. The system and method include determining, by a wireless communication device, a channel access priority of a medium access control (MAC) protocol data unit (PDU), wherein the MAC PDU is to be multiplexed by data from a plurality of logical channels (LCHs); performing, by the wireless communication device, a channel access procedure according to the channel access priority.

20 Claims, 7 Drawing Sheets

(56) References Cited

U.S. PATENT DOCUMENTS

| | | | |
|---|---|---|---|
| 2021/0185722 A1* | 6/2021 | Li | H04L 5/0044 |
| 2021/0219322 A1* | 7/2021 | Chin | H04W 72/23 |
| 2021/0243795 A1* | 8/2021 | Kuo | H04W 72/23 |
| 2022/0030623 A1* | 1/2022 | Wang | H04W 74/0808 |
| 2022/0150916 A1* | 5/2022 | Liu | H04W 74/0808 |
| 2022/0210827 A1* | 6/2022 | Wang | H04W 74/08 |
| 2022/0312481 A1* | 9/2022 | Talarico | H04W 74/0866 |
| 2022/0353899 A1* | 11/2022 | Xiao | H04W 72/23 |
| 2022/0376879 A1* | 11/2022 | Li | H04L 1/1854 |

FOREIGN PATENT DOCUMENTS

| | | | | |
|---|---|---|---|---|
| EP | 3611988 B1 * | 3/2021 | | H04W 72/10 |
| JP | 2023043890 A * | 3/2023 | | H04W 72/042 |
| WO | WO-2021159534 A1 * | 8/2021 | | |

OTHER PUBLICATIONS

Intel Corporation: "Channel Access Priority selection & multiplexing for Configured Grant," 3GPP TSG-RAN WG2 107bis, R2-1912627, Oct. 14-18, 2019, Chongqing, China (3 pages).

ZTE: "Considerations on configured grant for NR-U," 3GPP TSG RAN WG2 NR #104 Meeting, R2-1816830, Nov. 12-16, 2018, Spokane, US (5 pages).

Ericsson: "Discussions on channel access priority in NR-U" 3GPP TSG-RAN WG2 #106 Tdoc R2-1907582 (Revision of R2-l904744) May 17, 2019(May 17, 2019) Reno, US (4 pages).

International Search Report and Written Opinion for PCT Appl. No. PCT/CN2020/076161 mailed Nov. 26, 2020 (8 pages).

ZTE Corporation et al.: "UL data multiplexing and channel access priority for NR-U" 3GPP TSG RAN WG2 NR #106 Meeting R2-l906311 May 17, 2019(May 17, 2019) Reno, USA (4 pages).

* cited by examiner

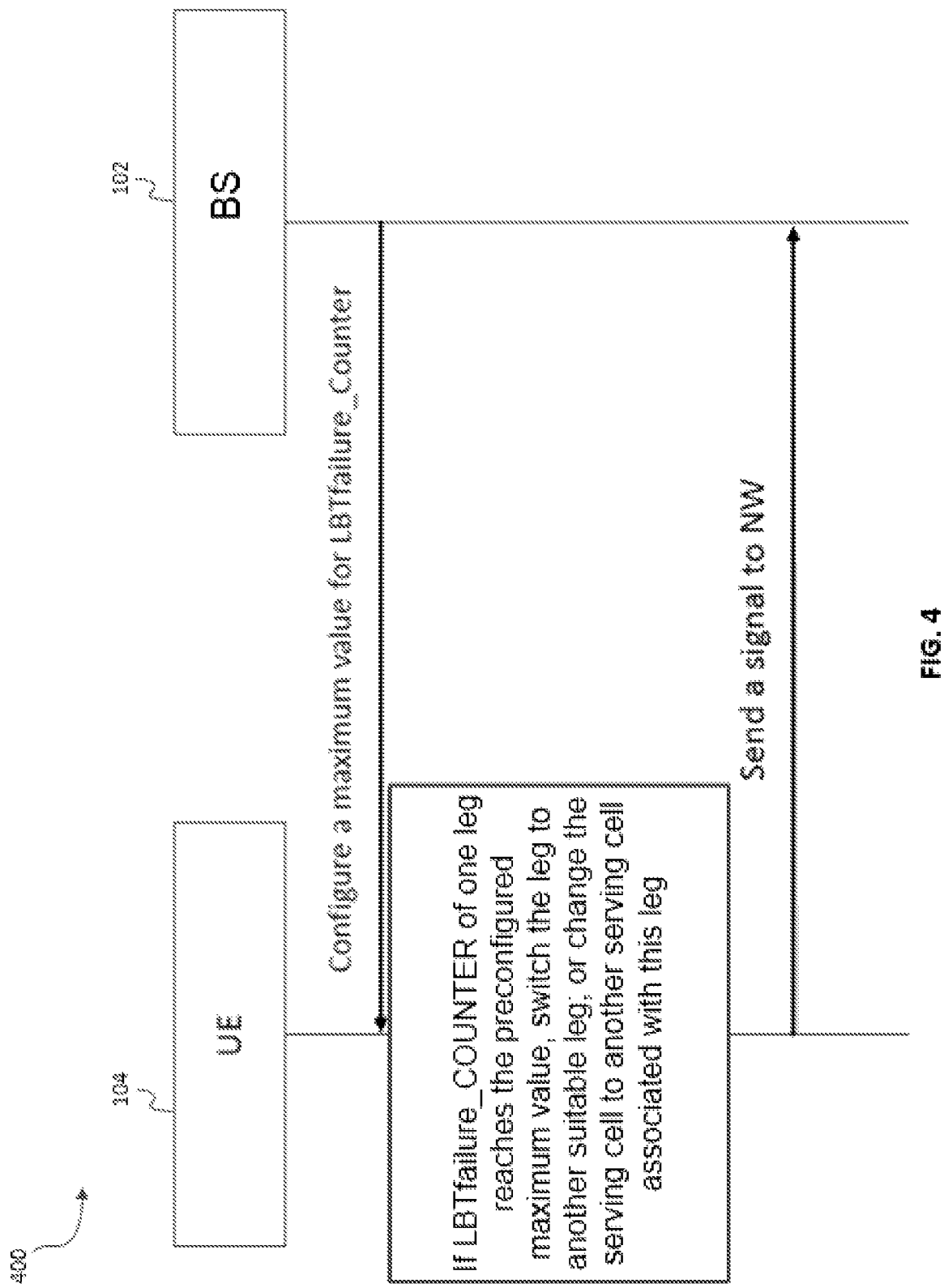

| Channel Access Priority Class (p) | $m_p$ | $CW_{min,p}$ | $CW_{max,p}$ | $T_{ulm\ cot,p}$ | allowed $CW_p$ sizes | The range of time scale |
|---|---|---|---|---|---|---|
| 1 | 2 | 3 | 7 | 2 ms | {3,7} | For CW= 3, [0, 172us]<br>For CW = 7, [0, 344us] |
| 2 | 2 | 7 | 15 | 4 ms | {7,15} | For CW = 7, [0,344us]<br>For CW =15, [0, 688us] |
| 3 | 3 | 15 | 1023 | 6ms or 10 ms | {15,31,63,127,255,511,1023} | For CW= 15, [0,832us]<br>For CW =31, [0, 1664us]<br>For CW = 63, [0,3328us] |
| 4 | 7 | 15 | 1023 | 6ms or 10 ms | {15,31,63,127,255,511,1023} | ... |

Note1: For p = 3,4, $T_{ulm\ cot,p}$ = 10ms if the higher layer parameter absenceOfAnyOtherTechnology-r14 or absenceOfAnyOtherTechnology-r16 is provided, otherwise, $T_{ulm\ cot,p}$ = 6ms.

Note 2: When $T_{ulm\ cot,p}$ = 6ms it may be increased to 8ms by inserting one or more gaps. The minimum duration of a gap shall be 100us. The maximum duration before including any such gap shall be 6ms.

FIG. 5

600 determining, by a wireless communication device, a channel access priority of a medium access control (MAC) protocol data unit (PDU), wherein the MAC PDU is to be multiplexed by data from a plurality of logical channels (LCHs)
602 performing, by the wireless communication device, a channel access procedure according to the channel access priority
604

700
Triggering, by a wireless communication device, a channel access priority procedure with a channel access priority class Pi of a medium access control (MAC) protocol data unit (PDU), wherein there is one ongoing channel access procedure with a priority class Pj
702
determining, by the wireless communication device, which channel access procedure to perform
704
FIG. 7

METHOD OF DATA TRANSMISSION IN UNLICENSED BAND

CROSS-REFERENCE TO RELATED APPLICATION

This application claims the benefit of priority under 35 U.S.C. § 120 as a continuation of PCT Patent Application No. PCT/CN2020/076161, filed on Feb. 21, 2020, the content of which is incorporated herein by reference in its entirety.

TECHNICAL FIELD

The disclosure relates generally to wireless communications and, more particularly, to systems and methods for meeting the delay and reliability requirements for signal transmission using Ultra-Reliable Low Latency Communication (URLLC) in the unlicensed band.

BACKGROUND

The standardization organization Third Generation Partnership Project (3GPP) is currently in the process of specifying a new Radio Interface called 5G New Radio (5G NR). A 5G NR system supports various services, such as the Ultra-Reliable Low-Latency Communication (URLLC) service. The URLLC service provides support for high reliability and low latency services.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes determining, by a wireless communication device (e.g., UE 104 in FIG. 1), a channel access priority of a medium access control (MAC) protocol data unit (PDU), wherein the MAC PDU is to be multiplexed by data from a plurality of logical channels (LCHs). In some embodiments, the method includes performing, by the wireless communication device, a transmission of the MAC PDU according to the channel access priority.

In some embodiments, the method includes determining, by a wireless communication device, a channel access priority of a medium access control (MAC) protocol data unit (PDU). In some embodiments, the MAC PDU is to be multiplexed by data from a plurality of logical channels (LCHs).

In some embodiments, the method includes performing, by the wireless communication device, a channel access procedure according to the channel access priority.

In some embodiments, the method includes receiving, by the wireless communication device, downlink channel information (DCI) comprising a channel access priority class. In some embodiments, the method includes determining, by the wireless communication device, the LCHs which can be selected for this uplink transmission.

In some embodiments, each of the plurality of LCHs is associated with a respective channel access priority of a plurality of channel access priorities. In some embodiments, the method includes determining, by the wireless communication device, that each respective channel access priority of the plurality of channel access priorities satisfies an LCH restriction.

In some embodiments, the LCHs whose channel access priority is equal to or greater than the channel access priority class indicated by the DCI can be selected for this UL transmission.

In some embodiments, the method includes receiving, by the wireless communication device, downlink channel information (DCI). In some embodiments, the method includes determining, by the wireless communication device, the channel access priority for UL transmission when a channel access priority class is absent from the DCI.

In some embodiments, each of the plurality of LCHs is associated with a respective channel access priority of a plurality of channel access priorities. In some embodiments, the transmission of the MAC PDU is according to a dynamic grant transmission. In some embodiments, the method includes determining, by the wireless communication device, a high priority indication from the DCI. In some embodiments, the method includes determining, by the wireless communication device and responsive to determining the high priority indication, a highest channel access priority from the plurality of channel access priorities. In some embodiments, the method includes selecting, by the wireless communication device, the highest channel access priority as the channel access priority of the MAC PDU.

In some embodiments, each of the plurality of LCHs is associated with a respective channel access priority of a plurality of channel access priorities. In some embodiments, the transmission of the MAC PDU is according to a dynamic grant transmission. In some embodiments, the method includes determining, by the wireless communication device, a low priority indication from the DCI. In some embodiments, the method includes determining, by the wireless communication device and responsive to determining the low priority indication, a lowest channel access priority from the plurality of channel access priorities. In some embodiments, the method includes selecting, by the wireless communication device, the lowest channel access priority as the channel access priority of the MAC PDU.

In some embodiments, each of the plurality of LCHs is associated with a respective channel access priority of a plurality of channel access priorities. In some embodiments, the transmission of the MAC PDU is according to a configured grant transmission. In some embodiments, the method includes receiving, by the wireless communication device, an RRC configuration for this configured grant transmission comprising an information element. In some embodiments, the method includes determining, by the wireless communication device, a high priority indication from the information element. In some embodiments, the method includes determining, by the wireless communication device and responsive to determining the high priority indication, a highest channel access priority from the plurality of channel access priorities. In some embodiments, the method includes selecting, by the wireless communication device, the highest channel access priority as the channel access priority of the MAC PDU.

In some embodiments, each of the plurality of LCHs is associated with a respective channel access priority of a plurality of channel access priorities. In some embodiments, the transmission of the MAC PDU is according to a configured grant transmission or a dynamic grant transmission. In some embodiments, the method includes determining, by the wireless communication device, that two or more LCHs of the plurality of LCHs are each associated with a respective information element. In some embodiments, the method includes determining, by the wireless communication device, a highest channel access priority from the plurality of channel access priorities that are associated with the two or more LCHs. In some embodiments, the method includes selecting, by the wireless communication device, the highest channel access priority as the channel access priority of the MAC PDU.

In some embodiments, each of the plurality of LCHs is associated with a respective channel access priority of a plurality of channel access priorities. In some embodiments, the transmission of the MAC PDU is according to a configured grant transmission or a dynamic grant transmission. In some embodiments, the method includes determining, by the wireless communication device, that only one LCH of the plurality of LCHs is associated with a respective information element. In some embodiments, the method includes selecting, by the wireless communication device, the respective channel access priority associated with the only one LCH as the channel access priority of the MAC PDU.

In some embodiments, each of the plurality of LCHs is associated with a respective channel access priority of a plurality of channel access priorities. In some embodiments, the transmission of the MAC PDU is according to a configured grant transmission or a dynamic grant transmission. In some embodiments, the method includes determining, by the wireless communication device, that none of the plurality of LCHs is associated with a respective information element. In some embodiments, the method includes selecting, by the wireless communication device, a default channel access priority associated with a legacy mechanism as the channel access priority of the MAC PDU.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 is a flow diagram of an example switching of leg for PDCP duplication in NRU, in accordance with a conventional embodiment.

FIG. 5 illustrates a table of example channel access priority class for UL, in accordance with an embodiment of the present disclosure.

FIG. 7 is a flow diagram depicting a method for meeting the delay and reliability requirements for signal transmission using Ultra-Reliable Low Latency Communication (URLLC) in the unlicensed band from the UE perspective, in accordance with some embodiments of the present disclosure.

DETAILED DESCRIPTION OF EXEMPLARY EMBODIMENTS

Figure 1:
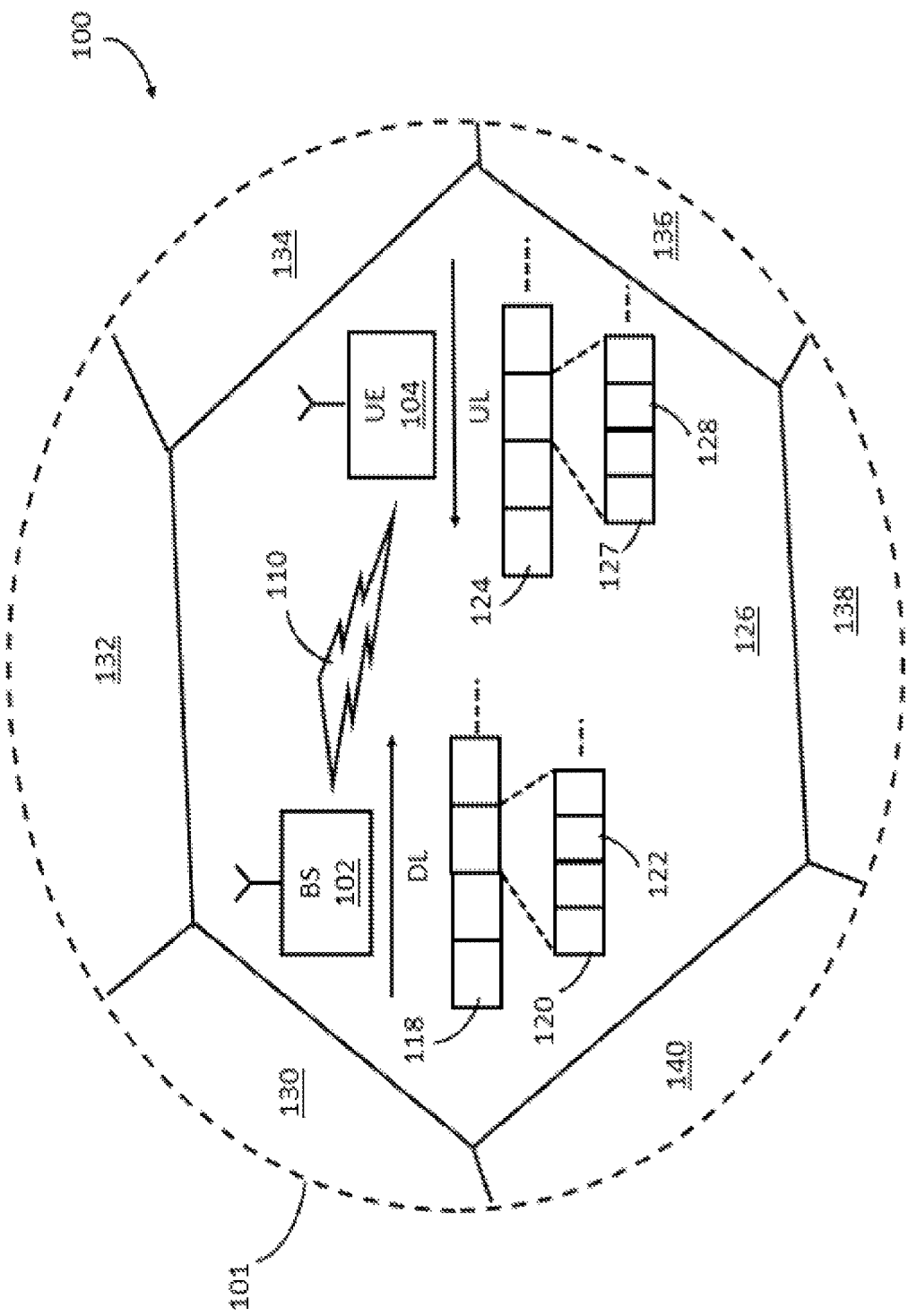
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
CAP Channel Access Priority
CAPC Channel Access Priority Class
CG Configured Grant
COT Channel Occupation Time
DCI Downlink Control Information
DG Dynamic Grant
DL Down Link or Downlink
eMBB Enhanced Mobile Broadband
eNB Evolved Node B
ETSI European Telecommunications Standards Institute
LBT Listen Before Talk/Listen Before Send
LCHs Logical Channels
LTE Long Term Evolution
MAC Medium Access Control
MSC Mobile Switching Center
NAS Non-Access Stratum
NR Next Generation RAN
NRU Next Radio Unlicensed
OFDM Orthogonal Frequency-Division Multiplexing OFDMA Orthogonal Frequency-Division Multiple Access
OSI Open Systems Interconnection
PDCP Packet Data Convergence Protocol
PDU Package Data Unit
RAN Radio Access Network
RLC Radio Link Control
RRC Radio Resource Control
UE User Equipment
UL Up Link or Uplink
URLLC Ultra-Reliable Low Latency Communication The 5G-NR system supports various services, such as the Ultra-Reliable Low-Latency Communication (URLLC) service. The URLLC service provides support for high reliability and low latency services. In some instances, the URLLC service may provide reliability as high as a 99.9999% block error rate with its air interface transmission delay within 1 millisecond.

Enabling URLLC service over 5G wireless networks creates challenging design requirements, particularly in meeting the stringent delay and reliability requirements for the URLLC service. To address these requirements, 3GPP RAN has introduced a packet duplication functionality at the Packet Data Convergence Protocol (PDCP) layer in 5G-NR. In PDCP duplication, which is supported for both user and control planes, each data packet is duplicated (e.g., carrying the same PDCP sequence number) and transmitted concurrently (e.g., within small gaps in time) over two independent networks and/or two independent legs (e.g., a transmission path between BS 102 in FIG. 1 and a UE 104 in FIG. 1). The PDCP layer in the transmitter is responsible for packet duplication whereas the PDCP layer in the receiver eliminates duplicate packets.

While PDCP duplication may improve transmission reliability, it has limitations when operating 5G in the unlicensed band, also referred to as New Radio Unlicensed (NRU). That is, to avoid inter-UE transmission conflict in NRU, every transmission (e.g., DL and UL) can only be transmitted when the corresponding Listen Before Talk/Listen Before Send (LBT) procedure is performed successfully. However, if one leg of a PDCP duplication transmission suffers from a congested channel state, then all the transmissions may eventually be delayed via this leg. Thus, there is a long-felt need for defining a UE based behavior to avoid the transmission delay via one leg when using PDCP duplication transmission in NRU.

Accordingly, the systems and methods discussed herein provide a mechanism for meeting (e.g., satisfying, etc.) the delay and reliability requirements for signal transmission using URLLC in the unlicensed band. By way of a non-limiting example, as discussed in greater detail below, the embodiments described herein may include one or more of the following features:

A "first feature" for performing an enhanced PDCP duplication to avoid transmission delay via one leg.

A "second feature" (also referred to herein as, "Dormancy Band/BWP/CC for NRU") for determining how to select a leg or serving cell for NRU PDCP duplication transmission.

A "third feature" for determining a channel access priority of a MAC PDU transmission.

A "fourth feature" for defining priority handling if there exists a conflict between two channel access procedures.

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
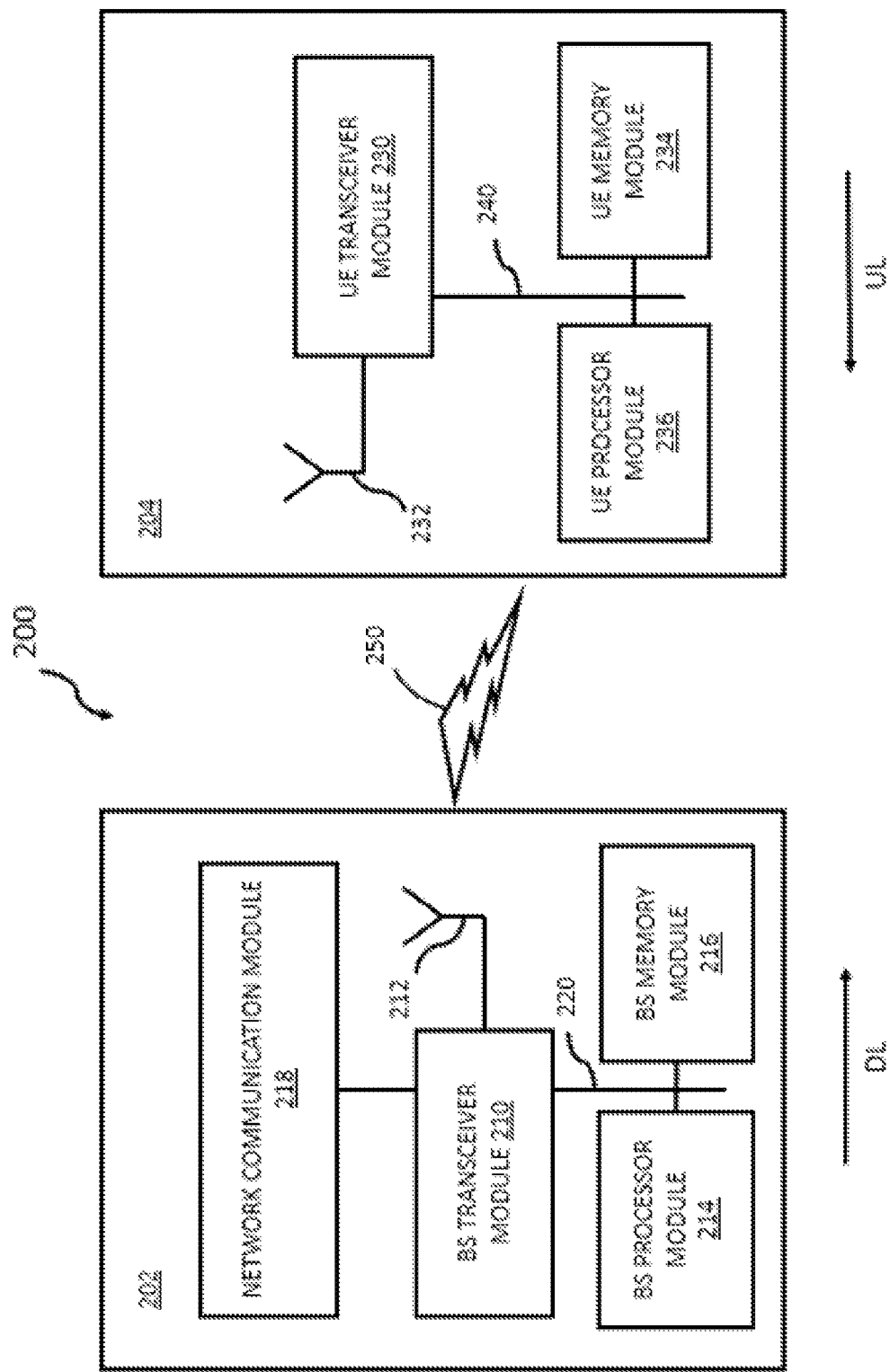
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), gNB, a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Selecting a Leg or Serving Cell for PDCP Duplication in NRU

In some embodiments, a BS 102 may configure (e.g., initialize, arrange, adjust, modify, etc.) the UE 104 with a PDCP duplication transmission. In some embodiments, the PDCP duplication may have more than or equal to the two legs. In some embodiments, a leg may include one RLC entity, one LCH, and/or one or more serving cells. In some embodiments, a leg can be identified by a RLC entity, an LCH, and/or one or more serving cells.

In some embodiments, the UE 104 may compare LBT failure times on one leg to a predetermined threshold value by following a certain rule. In some embodiments, if the UE 104 determines that the LBT failure times on one leg are greater than the preconfigured threshold value, then the UE 104 may change this leg to a different leg automatically. In some embodiments, if the UE 104 determines that the LBT failure times on one leg are greater than the predetermined threshold value by following a predetermined rule, then the UE 104 may send a MAC CE or a PUCCH signaling to the BS 102 for acquiring to change this leg to a different leg. In some embodiments, the MAC CE may include at least one of the following information: a Data Radio Bearer (DRB) identifier; a Radio Link Control (RLC) entity identifier, and a Logical Channel (LCH) identifier.

In some embodiments, the UE 104 may compare LBT failure times on one serving cell associated with this leg to a predetermined threshold value. In some embodiments, if the UE 104 determines that the LBT failure times on the one serving cell associated with this leg are greater than a threshold value by following a certain rule, then the UE 104 may change the mapping relationship of this leg to a pre-configured serving cell automatically. In some embodiments, if the UE 104 determines that the one or more LBT failure times on the one serving cell associated with this leg are greater than a threshold value, then the UE 104 may send a MAC CE or PUCCH signaling to BS 102 for acquiring to change the mapping relationship of this leg to a different serving cell. In some embodiments, the MAC CE may include at least one of the following information: a DRB identifier; an RLC identifier, a LCH identifier, a Serving Cell identifier, and, an activation/deactivation indicator.

In some embodiments, the UE 104 may determine that the LBT failure times on a leg and/or a serving cell/Band in MAC entity have reached a predetermined threshold value by following certain rule (e.g., a maximum value).

In some embodiments, the UE 104 may determine that the LBT failure times on a leg and/or a serving cell/Band in MAC entity have reached a predetermined threshold value (e.g., a maximum value) based on a timer and a counter.

In some embodiments, a UE 104 may introduce (e.g., define, create) an LBT failure detection timer (e.g., LBT_failureDetectionTimer). In some embodiments, the LBT failure detection timer may be configured to start and/or restart responsive to receiving an LBT failure indication from a lower layer (e.g., Physical Layer). In some embodiments, an LBT COUNTER may be reset responsive to the LBT failure detection timer expiring.

In some embodiments, a UE 104 may introduce (e.g., define, create, etc.) an LBTfailure_COUNTER. In some embodiments, the LBTfailure_COUNTER may be configured to reset responsive to the LBT_failureDetectionTimer expiring. In some embodiments, the LBTfailure_ COUN-TER may be configured to increment (e.g., count) by one responsive to receiving an LBT failure indication from a lower layer (e.g., Physical Layer). In some embodiments, once the LBTfailure_COUNTER reaches a predetermined threshold value (e.g., a maximum value), the UE 104 may change the leg to another candidate leg and/or change the current mapping serving cell to other candidate serving cell(s) automatically.

In some embodiments, the UE may change the leg and/or change the current mapping serving cell of this LCH automatically. In some embodiments, UE 104 will trigger at least one of the following signaling to the network (e.g., BS 102 in FIG. 1) for notifying the change of the leg: (1) BSR MAC CE, (2) RLC activation/deactivation MAC CE, (3) serving cell activation/deactivation for PDCP duplication MAC CE, and (4) a PUCCH signal.

In some embodiments, the RLC activation/deactivation MAC CE may include at least one of the following information: an RLC entity identifier; a DRB identifier; the activation/deactivation indicator, an LCH identifier, and a cell group identifier.

In some embodiments, the serving cell activation/deactivation for PDCP duplication MAC CE may include at least one of the following information: a serving cell identifier, an RLC entity identifier, a DRB identifier, the activation/deactivation indicator, an LCH identifier, a cell group identifier.

In some embodiments, a UE 104 may introduce (e.g., define, create, etc.) an LBTfailure_COUNTER. In some embodiments, the LBTfailure_COUNTER may be configured to reset responsive to the LBT_failureDetectionTimer expiring. In some embodiments, the LBTfailure_ COUN-TER may be configured to increment (e.g., count) by one responsive to receiving an LBT failure indication from a lower layer (e.g., Physical Layer). In some embodiments, once the LBTfailure_COUNTER reaches a predetermined threshold value (e.g., a maximum value), the UE 104 may send a signal to indicate to a network (e.g., BS 102 in FIG. 1) for acquiring (e.g., obtaining, retrieving, etc.) the leg change and/or change the current mapping serving cell for the failed leg. In some embodiments, the signal can be one MAC CE or one PUCCH signal. In some embodiments, the MAC CE may include at least one of the following information: a DRB identifier; an RLC identifier, a LCH identifier, and a serving cell identifier, and an activation/deactivation indicator.

2.1. Dormancy Band/BWP/CC for NRU

In some embodiments, the BS 102 may configure the UE 102 with one or more candidate bands/Bandwidth Parts (BWP)/Component Carriers (CC) for NRU in order to allow the UE 104 to measure the congestion state in the band/BWP/CC.

In some embodiments, the UE 104 may measure the congestion state of the band/BWP/CC.

In some embodiments, the UE 104 may compare the congestion state of the band/BWP/CC to a predetermined threshold value. In some embodiments, if the UE 102 determines that the congestion state of the band/BWP/CC is less than and/or equal to a threshold value, then the UE 102 identifies the band/BWP/CC as an "available" band/BWP/CC (e.g., low congestion) for transmitting data to the BS 102.

In some embodiments, if the UE 104 determines that the congestion state of the band/BWP/CC is greater than the predetermined threshold value, then the UE 104 may change the leg to a different leg which is associated with an "available" band/BWP/CC. In some embodiments, the different leg may have a congestion state that is less than or equal to the threshold value.

In some embodiments, the UE 103 may determine a congestion state of a band/BWP/CC by measuring a received signal strength measurement, a virtual LBT result, and/or any other measurement which may indicate the band/CC/BWP congestion state.

In some embodiments, the UE 103 may identify a candidate leg and/or serving cell/Band responsive to determining (e.g., detecting, etc.) that an automatic leg change and/or serving cell/Band change is triggered (e.g., activated, initiated, etc.).

2.2. Automatic Switching of Leg for PDCP Duplication in NRU

Figure 3:
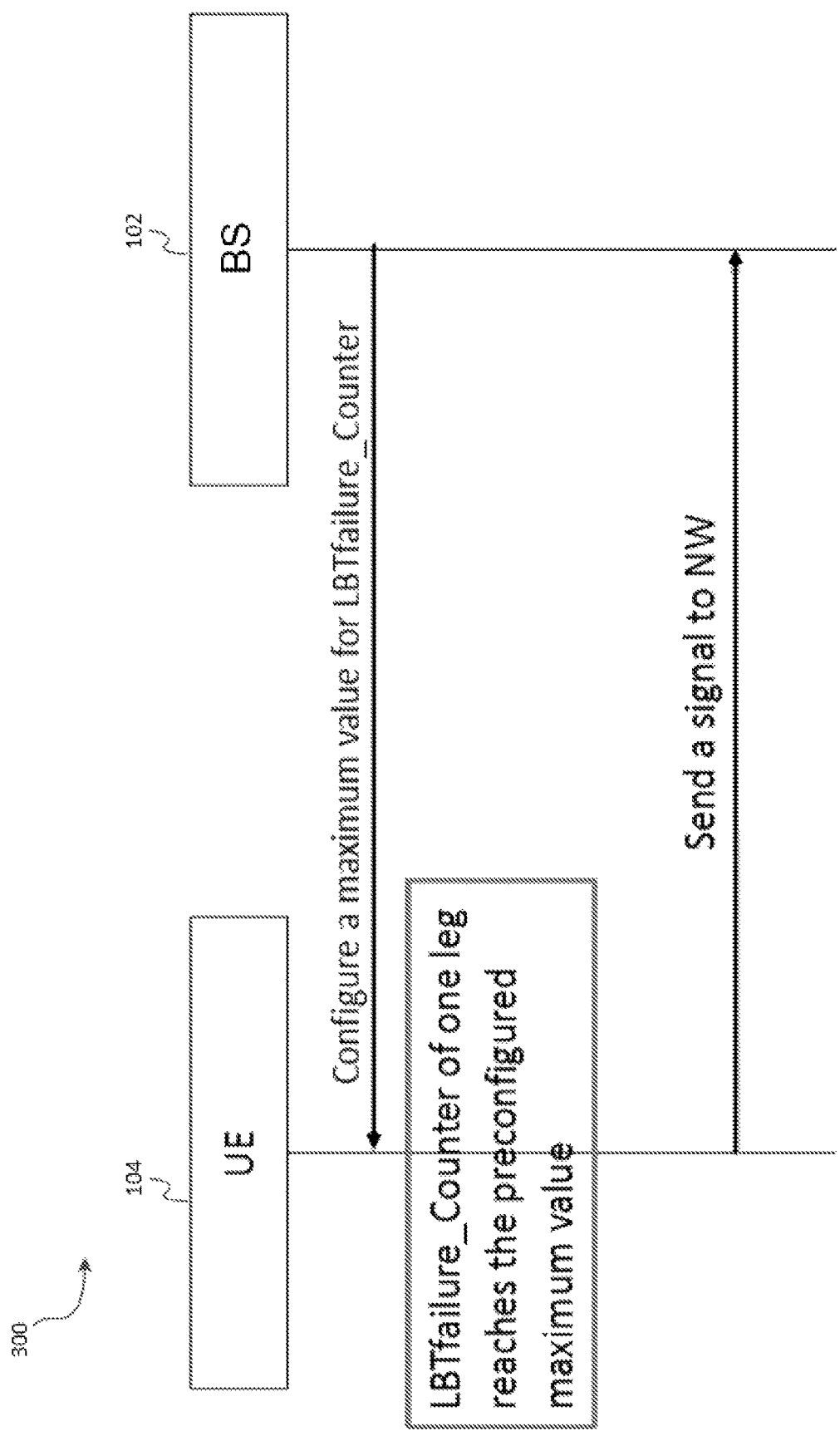
FIG. 3 is a flow diagram of an example switching of leg for PDCP duplication in NRU, in accordance with a conventional embodiment.

FIG. 3 is a flow diagram of an example switching of leg for PDCP duplication in NRU, in accordance with a conventional embodiment. The flow diagram 300 includes a UE 104 and a BS 102. The BS 102 may, in some embodiments, send a message to the UE 104 to configure (e.g., initialize, arrange, adjust, modify, etc.) a maximum value for LBTfailure_COUNTER.

If LBTfailure_COUNTER of one leg reaches the preconfigured maximum value, then the UE 104 may, in some embodiments, send (e.g., transmit, deliver, etc.) a signal to the BS 102. In some embodiments, the signal may be defined, as discussed herein. For example, the UE 104 may send a signal to indicate to a network (e.g., BS 102 in FIG. 1) for acquiring (e.g., obtaining, retrieving, etc.) the leg change and/or change the mapping serving cell of this leg. In some embodiments, the signal can be one MAC CE or one PUCCH signal. In some embodiments, the MAC CE may include at least one of the following information: a DRB identifier; an RLC identifier, a LCH identifier, and a serving cell identifier, and an activation/deactivation indicator.

FIG. 4 is a flow diagram of an example switching of leg for PDCP duplication in NRU, in accordance with a conventional embodiment. The flow diagram 400 includes a UE 104 and a BS 102. The BS 102 may, in some embodiments, send a message to the UE 104 to configure (e.g., initialize, arrange, adjust, modify, etc.) a maximum value for LBTfailure_COUNTER.

If LBTfailure_COUNTER of one leg reaches the preconfigured maximum value, then the UE 104 may, in some embodiments, change (e.g., modify, adjust, etc.) the leg to another candidate one and/or change the mapping serving cell(s) to other candidate mapping serving cell(s). The UE 104 may, in some embodiments, may send a signal to the BS 104 for indicating such change. In some embodiments, the signal may be defined, as discussed herein. In some embodiments, a candidate leg or serving cell may be defined, as discussed herein. For example, the UE 103 may identify a candidate leg and/or serving cell/Band responsive to determining (e.g., detecting, etc.) that an automatic leg change and/or serving cell/Band change is triggered (e.g., activated, initiated, etc.).

3. Overview of Channel Access Priority for a MAC PDU Transmission

In some embodiments, one channel access procedure in NRU may be performed (e.g., completed, executed, implemented, etc.) before one or more UL/DL transmissions (e.g., one, two, any, etc.). In some embodiments, a channel access procedure may be allocated (e.g., grouped, organized, etc.) into two categories: a Type 1 Channel Access Procedure and a Type 2 Channel Access Procedure.

FIG. 5 illustrates a table of example channel access priority class for UL, in accordance with an embodiment of the present disclosure. The table 500 includes a first column (shown in FIG. 5 as, "Channel Access Priority Class (p)") indicating four different channel access priority classes of a MAC PDU for UL based on legacy behavior. The Channel Access Priority Class (p) ranges from 1 to 4, where a larger value of p means a lower priority level.

The table 500 includes a second column (shown in FIG. 5 as, "mp") indicating the number of slots in a defer (e.g., delay, postpone, suspend, pause, etc.) period.

The table 500 includes a third column (shown in FIG. 5 as, "CWmin,p") and a fourth column (shown in FIG. 5 as, "CWmax,p"), each indicating the minimum and maximum values of a CW size, respectively.

The table 500 includes a fifth column (shown in FIG. 5 as, "Tulm cot,p") indicating the maximum channel occupancy time for a channel access priority class (p). For example, for the channel access priority classes (p) 3 and 4, Tulm cot,p may be 10 milliseconds if the absence of any other co-located technology sharing the same spectrum band can be guaranteed on a long-term basis. In a different case, the channel access priority classes (p) may be limited to 6 milliseconds. According, a BS 102 may not continuously transmit in the unlicensed spectrum for a period longer than Tulm cot,p.

The table 500 includes a sixth column (shown in FIG. 5 as, "allowed CWp") and a seventh column (shown in FIG. 5 as, "The range of time scale").

4. Determination of Channel Access Priority for a MAC PDU Transmission

In a first instance (referred to herein as, "Case A"), the channel access priority class for a MAC PDU transmission that is multiplexed by the data from multiple logical channels (LCHs) is indicated in the DCI.

In a second instance (referred to herein as, "Case B"), the channel access priority class for a MAC PDU transmission that is multiplexed by the data from multiple logical channels (LCHs) is not (e.g., absent, silent, etc.) indicated in the DCI. In response to the UE 104 determining that the channel access priority class is not indicated in the DCI, the UE 104 may select the channel access priority based on the channel access priority with which the LCHs are selected for the multiplexing a MAC PDU in certain criterion.

Thus, for guaranteeing the delay requirement of URLLC transmission, more data with lower channel access priority may be carried into a MAC PDU in "Case A", while the higher channel access priority (i.e., lower priority value in above table) for MAC PDU transmission may be determined in "Case B".

4.1 Channel Access Priority Class Indicated in DCI ("Case A")

In some embodiments, the UE 104 may determine that the channel access priority for a MAC PDU transmission that is multiplexed by the indication from DCI. In response to the determination, the UE 104 may add (e.g., modify, introduce, update, etc.) the channel access priority indication as a new LCH restriction (sometimes referred to as, "an LCH condition").

In some embodiments, the UE 104 may introduce a new LCH restriction. In some embodiments, responsive to receiving the indication, the UE 104 (e.g., the MAC layer) may multiplex (e.g., combine, interleave) the data from the LCHs based on at least one of the following criterion: (1) whose channel access priority value is equal or greater than the indicated access channel priority value in DCI; (2) whose channel access priority is less than the indicated access channel priority value in DCI.

4.2 Channel Access Priority Class is not Indicated in DCI ("Case B")

In some embodiments, the BS 102 sends scheduling instructions to the UE 104 to configure the UE 104 into dynamic grant. In some embodiments, the BS 102 sends scheduling instructions to the UE 104 to configure the UE 104 into configured grant.

4.2.1 Dynamic Grant or DCI Activated Configured Grant

In some embodiments, for dynamic grant or configured grant activated by DCI, the UE 104 may determine that a channel priority indication is indicated in DCI. In response to the determination, the UE 104 may identify (e.g., label, indicate, classify, categorize, group, determine, etc.) the highest or the lowest channel access priority with which the LCH is multiplexed into the MAC PDU as the UL transmission's channel access priority.

In some embodiments, for dynamic grant or configured grant activated by DCI, the UE 104 may determine that a two-level priority indication (e.g., PriorityIndex) is indicated in DCI. This priority indication indicates this scheduling is for higher priority transmission, for example, URLLC transmission, or this scheduling is not for higher priority transmission, for example, eMBB transmission. In response to the determination, the UE 104 may identify (e.g., label, indicate, classify, categorize, group, determine, etc.) the highest or the lowest channel access priority with which the LCH is multiplexed into the MAC PDU as the UL transmission's channel access priority.

4.2.2 Configured Grant

In some embodiments, for configured grant, an information element (e.g., "ChannelAccessPriorityDetermination") may be configured by the BS 102 into an RRC configuration of the configured grant, which indicates that the highest or the lowest channel access priority with which the LCH is multiplexed into the MAC PDU can be treated as the channel access priority for this configured grant.

In some embodiments, for configured grant, two-level indication (e.g., PriorityIndex) may be configured by the BS 102 into RRC configuration, if two-level indication indicates this configured grant is a higher priority grant, which indicates that the highest channel access priority with which the LCH is multiplexed into the MAC PDU can be treated as the channel access priority for this configured grant; and/or if two-level indication indicates this configured grant is a lower priority grant, which indicates that the lowest channel access priority with which the LCH is multiplexed into the MAC PDU can be treated as the channel access priority for this configured grant.

In some embodiments, the UE 104 may determine that the information element is introduced into the RRC configuration of the configured grant, and identify, responsive to the determination, the highest channel access priority or the lowest channel access priority with which the LCH is multiplexed into the MAC PDU as this UL transmission's channel access priority.

4.2.3 Dynamic Grant or Configured Grant

In some embodiments, for both configured grant and/or dynamic grant, an information element (e.g., "ChannelAccessPriorityDetermination") may be introduced into an RRC configuration of a LCH.

In some embodiments, the UE 104 may determine the channel access priority for a UL transmission (e.g., MAC PDU) based on the information element.

In some embodiments, in the case that multiple LCHs configured with the information element (e.g., "ChannelAccessPriorityDetermination") whose data is multiplexed into one MAC PDU, then the UE 104 may determine the channel access priority of the MAC PDU by the highest channel access priority indicated by the RRC configuration of the multiple LCHs.

In some embodiments, in the case that only one LCH with the information element (e.g., "ChannelAccessPriorityDetermination") whose data is multiplexed into one MAC PDU, then the UE 104 may determine the channel access priority of the MAC PDU by the LCH's access channel priority.

In some embodiments, in the case that none of LCH with this information element (e.g., "ChannelAccessPriorityDetermination") whose data is multiplexed into one MAC PDU, then the UE 104 may determine the channel access priority of the MAC PDU by the lowest channel access priority indicated by the RRC configuration of the multiple LCHs.

In some embodiments, for both configured grant and/or dynamic grant, an information element (e.g., "PriorityIndex") may be introduced into an RRC configuration of a LCH.

In some embodiments, the UE 104 may determine the channel access priority for a UL transmission (e.g., MAC PDU) based on this information element.

In some embodiments, in the case that the data from one or more LCHs are multiplexed into one MAC PDU and a few of these LCHs whose PriorityIndex indicates that the data from this LCH is higher priority data, then the UE 104 may determine the channel access priority of the MAC PDU by the highest channel access priority indicated by the RRC configuration of these multiple LCHs whose PrioirtyIndex indicates a higher priority transmission.

In some embodiments, in the case that the data from one or more LCHs with the information element (e.g., "PriorityIndex") are multiplexed into one MAC PDU and only one of these LCHs whose indication indicates that the data from this LCH is for higher priority transmission (e.g., URLLC transmission), then the UE 104 may determine the channel access priority of the MAC PDU by this LCH's access channel priority.

In some embodiments, in the case that one or more LCHs with the information element (e.g., "PriorityIndex") is multiplexed into one MAC PDU and none of LCH with this information element that indicates that the data from this LCH is for higher priority transmission (e.g., URLLC transmission), then the UE 104 may determine the channel access priority of the MAC PDU by the lowest channel access priority with which the LCH whose data is multiplexed into this MAC PDU.

Figure 6:
FIG. 6 is a flow diagram depicting a method for meeting the delay and reliability requirements for signal transmission using Ultra-Reliable Low Latency Communication (URLLC) in the unlicensed band from the UE perspective, in accordance with some embodiments of the present disclosure.

4.3 Method(s) for Implementing Exemplary Embodiment(s) of Case A and/or Case B FIG. 6 is a flow diagram depicting a method for meeting the delay and reliability requirements for signal transmission using Ultra-Reliable Low Latency Communication (URLLC) in the unlicensed band from the UE perspective, in accordance with some embodiments of the present disclosure. Additional, fewer, or different operations may be performed in the method depending on the particular embodiment. In some embodiments, some or all operations of method 600 may be performed by a wireless communication node, such as BS 102 in FIG. 1. In some operations, some or all operations of method 600 may be performed by a wireless communication device, such as UE 104 in FIG. 1. Each operation may be re-ordered, added, removed, or repeated.

As shown, the method 600 includes, in some embodiments, the operation 602 of determining, by a wireless communication device, a channel access priority of a medium access control (MAC) protocol data unit (PDU), wherein the MAC PDU is to be multiplexed by data from a plurality of logical channels (LCHs). The method includes, in some embodiments, the operation 604 of performing, by the wireless communication device, a channel access procedure according to the channel access priority.

In some embodiments, the method 600 includes determining, by a wireless communication device, a channel access priority of a medium access control (MAC) protocol data unit (PDU). In some embodiments, the MAC PDU is to be multiplexed by data from a plurality of logical channels (LCHs).

In some embodiments, the method 600 includes performing, by the wireless communication device, a transmission of the MAC PDU according to the channel access priority.

In some embodiments, the method 600 includes receiving, by the wireless communication device, downlink channel information (DCI) comprising a channel access priority class. In some embodiments, the method includes determining, by the wireless communication device, the channel access priority according to the channel access priority class.

In some embodiments, each of the plurality of LCHs is associated with a respective channel access priority of a plurality of channel access priorities. In some embodiments, the method 600 includes determining, by the wireless communication device, that each respective channel access priority of the plurality of channel access priorities satisfies an LCH condition.

In some embodiments, the LCH condition indicates that a channel access priority value of an LCH is equal to or greater than the channel access priority class of the DCI.

In some embodiments, the method 600 includes defining, by the wireless communication device and responsive to receiving the DCI, the LCH condition.

In some embodiments, the method 600 includes receiving, by the wireless communication device, downlink channel information (DCI). In some embodiments, the method 400 includes determining, by the wireless communication device, the channel access priority when a channel access priority class indication is absent from the DCI.

In some embodiments, each of the plurality of LCHs is associated with a respective channel access priority of a plurality of channel access priorities. In some embodiments, the transmission of the MAC PDU is according to a dynamic grant transmission. In some embodiments, the method 600 includes determining, by the wireless communication device, a high priority indication from the DCI. In some embodiments, the method 600 includes determining, by the wireless communication device and responsive to determining the high priority indication, a highest channel access priority from the plurality of channel access priorities. In some embodiments, the method 600 includes selecting, by the wireless communication device, the highest channel access priority as the channel access priority of the MAC PDU.

In some embodiments, each of the plurality of LCHs is associated with a respective channel access priority of a plurality of channel access priorities. In some embodiments, the transmission of the MAC PDU is according to a dynamic grant transmission. In some embodiments, the method 600 includes determining, by the wireless communication device, a low priority indication from the DCI. In some embodiments, the method 600 includes determining, by the wireless communication device and responsive to determining the low priority indication, a lowest channel access priority from the plurality of channel access priorities. In some embodiments, the method 600 includes selecting, by the wireless communication device, the lowest channel access priority as the channel access priority of the MAC PDU.

In some embodiments, each of the plurality of LCHs is associated with a respective channel access priority of a plurality of channel access priorities. In some embodiments, the transmission of the MAC PDU is according to a configured grant transmission. In some embodiments, the method 600 includes receiving, by the wireless communication device, an RRC message comprising an information element.

In some embodiments, the method 600 includes determining, by the wireless communication device, a high priority indication from the information element. In some embodiments, the method 600 includes determining, by the wireless communication device and responsive to determining the high priority indication, a highest channel access priority from the plurality of channel access priorities. In some embodiments, the method includes selecting, by the wireless communication device, the highest channel access priority as the channel access priority of the MAC PDU.

In some embodiments, each of the plurality of LCHs is associated with a respective channel access priority of a plurality of channel access priorities. In some embodiments, the method 600 includes determining, by the wireless communication device, that two or more LCHs of the plurality of LCHs are each associated with a respective information element. In some embodiments, the method 600 includes determining, by the wireless communication device, a highest channel access priority from the plurality of channel access priorities that are associated with the two or more LCHs. In some embodiments, the method 600 includes selecting, by the wireless communication device, the highest channel access priority as the channel access priority of the MAC PDU.

In some embodiments, each of the plurality of LCHs is associated with a respective channel access priority of a plurality of channel access priorities. In some embodiments, the method 600 includes determining, by the wireless communication device, that only one LCH of the plurality of LCHs is associated with a respective information element. In some embodiments, the method 600 includes selecting, by the wireless communication device, the respective channel access priority associated with the only one LCH as the channel access priority of the MAC PDU.

In some embodiments, each of the plurality of LCHs is associated with a respective channel access priority of a plurality of channel access priorities. In some embodiments, the method 600 includes determining, by the wireless communication device, that none of the plurality of LCHs is associated with a respective information element. In some embodiments, the method 600 includes selecting, by the wireless communication device, a lowest channel access priority associated with a legacy mechanism as the channel access priority of the MAC PDU.

5. Priority Handling for Conflicts Between Two Channel Access Procedures

In some embodiments, a UE (e.g., UE 104 in FIG. 1) may receive an UL grant and/or a DCI indicating a PUSCH transmission using Type 1 channel access procedure, and/or the UE 104 may maintain (e.g., preserve, continue, etc.) an ongoing Type 1 channel access procedure before the PUSCH transmission starting time.

In some embodiments, if the UL channel access priority class value (p1) used for the ongoing Type 1 channel access procedure is same or larger than the UL channel access priority class value (p2) indicated in the DCI, then the UE 104 may transmit (e.g., send, deliver, etc.) the PUSCH transmission in response to the UL grant by accessing (e.g., retrieving, obtaining, etc.) the channel by using the ongoing Type 1 channel access procedure.

In some embodiments, if the UL channel access priority class value (p1) used for the ongoing Type 1 channel access procedure is smaller than the UL channel access priority class value (p2) indicated in the DCI, the UE 104 may terminate (e.g., stop, dismiss, discontinue, suspend, etc.) the ongoing channel access procedure.

However, in some embodiments, if two access channel procedure are overlapped (e.g., conflicting, etc.), the channel access procedure with lower priority may override the procedure with higher priority, which may be contrary with the URLLC service requirement. For example, URLLC data need to access channel in a fast way, and there is no need for a UE to take a long time to occupy the channel for URLLC service. Thus, in the case that the channel access procedure is conflicted, the channel access priority procedure for URLLC service may override the channel access priority procedure for eMBB.

To improve this issue, the following steps may be taken into account:

In a first operation, if a channel access procedure is collided with an ongoing channel access procedure, then the UE 104 may identify which service the both UL grants are used for. In a second operation, the UE 104 may maintain of channel access procedure based on a certain principle.

5.1 Identifying a Common Service

In some embodiments, for dynamic grant, the related DCI may include a two-level priority indication: a low priority indication and a high priority indication. In some embodiments, the low priority indication may indicate that the UL grant is used for lower priority transmission (e.g., eMBB). In some embodiments, a high priority indication may indicate that the UL grant is used for higher priority transmission (e.g., URLLC)

In some embodiments, for configured grant, one indication may be introduced into RRC configuration which shows this configured grant is used for URLLC data or eMBB data.

In some embodiments, for configured grant, a LCH may be configured with an indication in RRC configuration to indicate that the data in this LCH is for URLLC or eMBB.

5.2 Maintaining a Channel Access Procedure

In some embodiments (referred to herein as, "Case 1"), a UE 104 may maintain a channel access procedure based on URLLC CAP (channel access procedure) versus eMBB CAP. In some embodiments, for Case 1, a URLLC CAP always override the eMBB CAP. In some embodiments, for Case 1, a URLLC CAP override the eMBB CAP conditionally.

In some embodiments, in the case of overlapping channel access procedure from different UL grants, a UE 104 may maintain ongoing channel access procedure based on at least one of the following case: (1) the ongoing channel access procedure triggered by dynamic grant whose addressing DCI carry a higher priority indication, and the later channel access procedure triggered by dynamic grant whose addressing DCI carry a lower priority indication; (2) the ongoing channel access procedure triggered by dynamic grant whose associated DCI carry a higher priority indication, and/or the overlapping channel access procedure triggered by configured grant whose configuration is including a priority indication indicates that this configured grant is a lower priority grant; (3) the ongoing channel access procedure triggered by configured grant whose configuration including the priority indication indicates that this configured grant have a higher priority, and/or the later triggered by dynamic grant whose associated DCI carry a lower priority indication; (4) the ongoing channel access procedure triggered by configured grant whose configuration including the priority indication indicates that this configured grant have a higher priority, and/or the later triggered by configured grant whose configuration is including the priority indication indicates that this configured grant have a lower priority; and (5) the data that triggering ongoing channel access procedure which is multiplexed with at least one LCH configured with higher priority indication, the data that triggering the later channel access procedure which is multiplexed with none of LCH configured with higher priority indication.

In some embodiments (referred to herein as, "Case 2"), a UE 104 may maintain a channel access procedure based on URLLC CAP versus URLLC CAP. In some embodiments, for Case 2, a UE 104 may apply a legacy behavior, as discussed herein. In some embodiments, for Case 2, a higher channel access priority class (e.g., a lower value) may override the lower channel access priority class (e.g., a higher value), which is inverse with legacy behavior.

In some embodiments (referred to herein as, "Case 3"), a UE 104 may maintain a channel access procedure based on eMBB CAP versus eMBB CAP. In some embodiments, for Case 3, a UE 104 may apply a legacy behavior, as discussed herein. In some embodiments, for Case 3, a higher channel access priority class (e.g., a lower value) may override the lower channel access priority class (e.g., a higher value), which is inverse with legacy behavior.

In some embodiments, in the case of overlapping channel access procedure from different UL grants with the same priority indication, a UE 104 may maintain ongoing channel access procedure based on at least one of the following case: (1) the priority channel access priority value for ongoing channel access procedure is lower than the priority channel access priority value of the later overlapping one; and (2) the priority channel access priority value for ongoing channel access procedure is higher than the later overlapping one.

5.3 Method(s) for Implementing Exemplary Embodiment(s) of Case 1, Case 2 and Case 3

FIG. 7 is a flow diagram depicting a method for meeting the delay and reliability requirements for signal transmission using Ultra-Reliable Low Latency Communication (URLLC) in the unlicensed band from the UE perspective, in accordance with some embodiments of the present disclosure. Additional, fewer, or different operations may be performed in the method 700 depending on the particular embodiment. In some embodiments, some or all operations of method 700 may be performed by a wireless communication node, such as BS 102 in FIG. 1. In some operations, some or all operations of method 700 may be performed by a wireless communication device, such as UE 104 in FIG. 1. Each operation may be re-ordered, added, removed, or repeated.

As shown, the method 700 includes, in some embodiments, the operation 702 of triggering, by a wireless communication device, a channel access priority procedure with a channel access priority class value Pi for a medium access control (MAC) protocol data unit (PDU) transmission. In some embodiments, there is one ongoing channel access procedure with a channel access priority class Pj. The method 700 includes, in some embodiments, the operation 704 of determining, by the wireless communication device, which channel access procedure to perform and/or continue to perform.

In some embodiments, the ongoing channel access procedure is triggered by the dynamic grant scheduled by DCI or configured grant activated by DCI, and this DCI may carry a priority indication. In some embodiments, the new channel access procedure is triggered by the dynamic grant scheduled by DCI or configured grant activated by DCI, and this DCI may carry a priority indication. In some embodiments, the priority indication (e.g., one indication included in DCI) for ongoing channel access procedure shows (e.g., indicates) that this transmission is a higher priority transmission and the priority indication (e.g., one indication included in DCI) for new triggering channel access procedure shows that this transmission is a lower priority transmission. In some embodiments, the value of Pi is less than the value of Pj. In some embodiments, the method 700 includes determining, by the wireless communication device, to perform (or continue to perform) the ongoing channel access procedure.

In some embodiments, the ongoing channel access procedure is triggered by the dynamic grant scheduled by DCI or configured grant activated by DCI, and this DCI carry a priority indication. In some embodiments, the new channel access procedure is triggered by the dynamic grant scheduled by DCI or configured grant activated by DCI, and this DCI carry a priority indication. In some embodiments, the priority indication (e.g., one indication included in DCI) for ongoing channel access procedure shows this transmission is a higher priority transmission (e.g., URLLC transmission) and the priority indication (e.g., one indication included in DCI) for new triggering channel access procedure shows this transmission is a higher priority transmission as well. In some embodiments, the value of Pi is less than the value of Pj. In some embodiments, the method 700 includes determining, by the wireless communication device, to perform (or continue to perform) the ongoing channel access procedure.

In some embodiments, the ongoing channel access procedure is triggered by the dynamic grant scheduled by DCI or configured grant activated by DCI, and this DCI carry a priority indication. In some embodiments, the new channel access procedure is triggered by the dynamic grant scheduled by DCI or configured grant activated by DCI, and this DCI carry a priority indication. In some embodiments, the priority indication (e.g., one indication included in DCI) for ongoing channel access procedure shows this transmission is a low priority transmission (e.g., eMBB transmission) and the priority indication (e.g., one indication included in DCI) for new triggering channel access procedure shows this transmission is a low priority transmission as well. In some embodiments, the value of Pi is great than or equal to the value of Pj. In some embodiments, the method 700 includes determining, by the wireless communication device, to perform (or continue to perform) the ongoing channel access procedure.

In some embodiments, the ongoing channel access procedure is triggered by the configured grant, and the configuration of this configured grant carry an information element as priority indication. In some embodiments, the new channel access procedure is triggered by the dynamic grant scheduled by DCI, and this DCI carries a priority indication. In some embodiments, the priority indication for ongoing channel access procedure shows the transmission is a low priority transmission while the priority indication (e.g., one indication in DCI) for new triggering channel access procedure shows the transmission is a high priority transmission. In some embodiments, the value of Pi is great than the value of Pj. In some embodiments, the method 700 includes determining, by the wireless communication device, the ongoing channel access procedure may be canceled and/or a new channel access procedure with priority class value Pj may be performed and/or continue to be performed.

In some embodiments, the ongoing channel access procedure is triggered by the configured grant, and the configuration of this configured grant carry an information element as priority indication. In some embodiments, the new channel access procedure is triggered by the dynamic grant scheduled by DCI, and this DCI carries a priority indication. In some embodiments, the priority indication for ongoing channel access procedure shows the transmission is a high priority transmission while the priority indication (e.g., one indication in DCI) for new triggering channel access procedure shows the transmission is a high priority transmission as well. In some embodiments, the value of Pi is great than the value of Pj. In some embodiments, the method 700 includes determining, by the wireless communication device, to cancel the ongoing channel access procedure. In some embodiments, the method 700 includes determining, by the wireless communication device, to perform a new channel access procedure with a channel access priority class value Pj.

In some embodiments, the ongoing channel access procedure is triggered by the configured grant, and the configuration of this configured grant may carry an information element as a priority indication. In some embodiments, the new channel access procedure is triggered by the dynamic grant scheduled by DCI, and this DCI carries a priority indication. In some embodiments, the priority indication for ongoing channel access procedure shows that the transmission is a low priority transmission while the priority indication (e.g., one indication in DCI) for new triggering channel access procedure shows that the transmission is a low priority transmission. In some embodiments, the value of Pj is greater than the value of Pi. In some embodiments, the method 700 includes determining, by the wireless communication device, the ongoing channel access procedure may be canceled and/or a new channel access procedure with priority class value Pj may be performed or continue to be performed.

In some embodiments, the ongoing channel access procedure is triggered by the configured grant, and the configuration of this configured grant may carry an information element as a priority indication. In some embodiments, the new channel access procedure is triggered by another configured grant, and the configuration of this configured grant may carry an information element as a priority indication. In some embodiments, the priority indication for ongoing channel access procedure shows that the transmission is a high priority transmission while the priority indication for a new triggering channel access procedure shows that the transmission is a low priority transmission. In some embodiments, the value of Pj is greater than the value of Pi. In some embodiments, the method 700 includes determining, by the wireless communication device, to perform (or continue to perform) the ongoing channel access procedure.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
   determining, by a wireless communication device, a channel access priority of a medium access control (MAC) protocol data unit (PDU), wherein the MAC PDU is to be multiplexed by data from a plurality of logical channels (LCHs); and
   performing, by the wireless communication device, a channel access procedure according to the channel access priority.

2. The method of claim 1, further comprising:
   receiving, by the wireless communication device, downlink control indication (DCI) comprising a channel access priority class; and
   determining, by the wireless communication device, at least one of the plurality of LCHs which can be selected for an uplink (UL) transmission.

3. The method of claim 2, wherein each of the plurality of LCHs is associated with a respective channel access priority of a plurality of channel access priorities and further comprising:
determining, by the wireless communication device, that each respective channel access priority of the plurality of channel access priorities satisfies an LCH restriction, wherein at least one of the plurality of LCHs whose channel access priority is equal to or greater than the channel access priority class indicated by the DCI can be selected for the UL transmission.

4. The method of claim 1, further comprising:
determining, by the wireless communication device, an upcoming configured grant occasion;
determining, by the wireless communication device, the channel access priority which is configured in the configuration of the upcoming configured grant; and
determining, by the wireless communication device, at least one of the plurality of LCHs to select for the uplink transmission.

5. The method of claim 4, wherein each of the plurality of LCHs is associated with a respective channel access priority of a plurality of channel access priorities and further comprising:
determining, by the wireless communication device, that each respective channel access priority of the plurality of channel access priorities satisfies an LCH restriction, wherein at least one of the plurality of LCHs whose channel access priority is equal to or greater than the channel access priority class indicated by the configuration of the upcoming configured grant can be selected for an uplink (UL) transmission.

6. The method of claim 1, further comprising:
receiving, by the wireless communication device, downlink control indication (DCI); and
determining, by the wireless communication device, the channel access priority for uplink (UL) transmission when a channel access priority class is absent from the DCI.

7. The method of claim 6, wherein each of the plurality of LCHs is associated with a respective channel access priority of a plurality of channel access priorities, wherein the transmission of the MAC PDU is according to a dynamic grant transmission, and further comprising:
determining, by the wireless communication device, a high priority indication from the DCI;
determining, by the wireless communication device and responsive to determining the high priority indication, a highest channel access priority from the plurality of channel access priorities; and
selecting, by the wireless communication device, the highest channel access priority as the channel access priority of the MAC PDU.

8. The method of claim 6, wherein each of the plurality of LCHs is associated with a respective channel access priority of a plurality of channel access priorities, wherein the transmission of the MAC PDU is according to a dynamic grant transmission, and further comprising:
determining, by the wireless communication device, a low priority indication from the DCI;
determining, by the wireless communication device and responsive to determining the low priority indication, a lowest channel access priority from the plurality of channel access priorities;
and selecting, by the wireless communication device, the lowest channel access priority as the channel access priority of the MAC PDU.

9. The method of claim 1, further comprising:
determining, by the wireless communication device, an upcoming configured grant occasion;
determining, by the wireless communication device, an absence of a channel access priority from a configuration of a configured UL grant; and
determining, by the wireless communication device and responsive to determining the absence of the channel access priority from the configuration of the configured UL grant, the channel access priority for an uplink (UL) transmission.

10. The method of claim 9, wherein each of the plurality of LCHs is associated with a respective channel access priority of a plurality of channel access priorities, wherein the transmission of the MAC PDU is according to a configured grant transmission, and further comprising:
determining, by the wireless communication device, a high priority indication from the configuration of the configured grant transmission;
determining, by the wireless communication device and responsive to determining the high priority indication, a highest channel access priority from the plurality of channel access priorities;
and selecting, by the wireless communication device, the highest channel access priority as a channel access priority of the MAC PDU.

11. The method of claim 9, wherein each of the plurality of LCHs is associated with a respective channel access priority of a plurality of channel access priorities, wherein the transmission of the MAC PDU is according to a configured grant transmission, and further comprising:
receiving, by the wireless communication device and for the configured grant transmission, an radio resource control (RRC) configuration comprising an information element;
determining, by the wireless communication device, a low priority indication from the information element;
determining, by the wireless communication device and responsive to determining the low priority indication, a lowest channel access priority from the plurality of channel access priorities; and
selecting, by the wireless communication device, the lowest channel access priority as the channel access priority of the MAC PDU.

12. The method of claim 6, wherein each of the plurality of LCHs is associated with a respective channel access priority of a plurality of channel access priorities, wherein the transmission of the MAC PDU is according to a configured grant transmission or a dynamic grant transmission, and the at least one processor is further comprising:
determining, by the wireless communication device, that two or more LCHs of the plurality of LCHs are each associated with a respective information element;
determining, by the wireless communication device, a highest channel access priority from the plurality of channel access priorities that are associated with the two or more LCHs; and
selecting, by the wireless communication device, the highest channel access priority as the channel access priority of the MAC PDU.

13. The method of claim 6, wherein each of the plurality of LCHs is associated with a respective channel access priority of a plurality of channel access priorities, wherein the transmission of the MAC PDU is according to a configured grant transmission or a dynamic grant transmission, and further comprising:

determining, by the wireless communication device, that only one LCH of the plurality of LCHs is associated with a respective information element; and selecting, by the wireless communication device, the respective channel access priority associated with the only one LCH as the channel access priority of the MAC PDU.

14. The method of claim 6, wherein each of the plurality of LCHs is associated with a respective channel access priority of a plurality of channel access priorities, wherein the transmission of the MAC PDU is according to a configured grant transmission or a dynamic grant transmission, and further comprising:

determining, by the wireless communication device, that none of the plurality of LCHs is associated with a respective information element; and selecting, by the wireless communication device, a lowest one of the plurality of channel access priorities as the channel access priority of the MAC PDU.

15. A wireless communication device comprising:

at least one processor configured to:

determine a channel access priority of a medium access control (MAC) protocol data unit (PDU), wherein the MAC PDU is to be multiplexed by data from a plurality of logical channels (LCHs); and perform a channel access procedure according to the channel access priority.

16. The wireless communication device of claim 15, wherein the at least one processor is configured to:

receive downlink channel information (DCI) comprising a channel access priority class; and determine at least one of the plurality of LCHs which can be selected for an uplink (UL) transmission.

17. The wireless communication device of claim 16, wherein each of the plurality of LCHs is associated with a respective channel access priority of a plurality of channel access priorities, and the at least one processor is configured to:

determine that each respective channel access priority of the plurality of channel access priorities satisfies an LCH restriction, wherein at least one of the plurality of LCHs whose channel access priority is equal to or greater than the channel access priority class indicated by the DCI can be selected for the UL transmission.

18. The wireless communication device of claim 15, further comprising:

determining, by the wireless communication device, an upcoming configured grant occasion;

determining, by the wireless communication device, the channel access priority which is configured in the configuration of the upcoming configured grant; and determining, by the wireless communication device, at least one of the plurality of LCHs to select for the uplink transmission.

19. The wireless communication device of claim 18, wherein each of the plurality of LCHs is associated with a respective channel access priority of a plurality of channel access priorities and further comprising:

determining, by the wireless communication device, that each respective channel access priority of the plurality of channel access priorities satisfies an LCH restriction, wherein at least one of the plurality of LCHs whose channel access priority is equal to or greater than the channel access priority class indicated by the configuration of the upcoming configured grant can be selected for an uplink (UL) transmission.

20. The wireless communication device of claim 15, further comprising:

receiving, by the wireless communication device, downlink control indication (DCI); and determining, by the wireless communication device, the channel access priority for uplink (UL) transmission when a channel access priority class is absent from the DCI.

* * * * *